US010965690B2

(12) United States Patent
Phan

(10) Patent No.: US 10,965,690 B2
(45) Date of Patent: Mar. 30, 2021

(54) METHOD FOR MANAGING THE STATUS OF A CONNECTED DEVICE

(71) Applicant: GEMALTO SA, Meudon (FR)

(72) Inventor: Ly Thanh Phan, Meudon (FR)

(73) Assignee: THALES DIS FRANCE SA, Meudon (FR)

(*) Notice: Subject to any disclaimer, the term of this patent is extended or adjusted under 35 U.S.C. 154(b) by 168 days.

(21) Appl. No.: 16/099,562

(22) PCT Filed: May 22, 2017

(86) PCT No.: PCT/EP2017/062234
§ 371 (c)(1),
(2) Date: Nov. 7, 2018

(87) PCT Pub. No.: WO2017/207316
PCT Pub. Date: Dec. 7, 2017

(65) Prior Publication Data
US 2019/0149558 A1 May 16, 2019

(30) Foreign Application Priority Data
Jun. 3, 2016 (EP) .................................. 16305646

(51) Int. Cl.
*G06F 21/00* (2013.01)
*H04L 29/06* (2006.01)
(Continued)

(52) U.S. Cl.
CPC ........ *H04L 63/126* (2013.01); *G06F 16/2379* (2019.01); *H04L 9/006* (2013.01);
(Continued)

(58) Field of Classification Search
CPC .......................... G06F 16/2379; G06F 63/126
(Continued)

(56) References Cited

U.S. PATENT DOCUMENTS 7,010,691 B2 * 3/2006 Wheeler ............... H04L 63/083
380/277
2010/0106967 A1 4/2010 Johansson
(Continued)

FOREIGN PATENT DOCUMENTS

| WO | WO2015056008 A1 | 4/2015 |
| WO | WO2015070055 A2 | 5/2015 |
| WO | WO2016060742 A1 | 4/2016 |

OTHER PUBLICATIONS

PCT/EP2017/062234, International Search Report, dated Jun. 30, 2017, European Patent Office, P.B. 5818 Patentlaan 2 NL—2280 HV Rijswijk.
(Continued)

*Primary Examiner* — Anthony D Brown
(74) *Attorney, Agent, or Firm* — The Jansson Firm; Rehr B. Jansson

(57) ABSTRACT

This invention relates to a method for managing the status of a connected device by publishing assertions in an immutable distributed database composed of a plurality of compute nodes, a pair of keys comprising a public key and a private key being associated with the connected device. The method comprises the steps of: receiving from a first terminal associated to a first user an instruction message; verifying that the first user is allowed to modify the status of the connected device; sending an assertion request to the immutable distributed database for publishing an assertion comprising the status information.

24 Claims, 6 Drawing Sheets

(51) Int. Cl.
| | |
|---|---|
| *H04W 12/00* | (2021.01) |
| *H04W 12/12* | (2021.01) |
| *G06F 16/23* | (2019.01) |
| *H04L 9/00* | (2006.01) |
| *H04W 4/70* | (2018.01) |
| *H04L 9/08* | (2006.01) |

(52) U.S. Cl.
CPC ... *H04W 12/0023* (2019.01); *H04W 12/1206* (2019.01); *H04L 9/0894* (2013.01); *H04W 4/70* (2018.02); *H04W 12/12* (2013.01)

(58) Field of Classification Search
USPC .......................................................... 713/164
See application file for complete search history.

(56) References Cited

U.S. PATENT DOCUMENTS

2013/0165072 A1\* 6/2013 Hoover ................. H04W 12/02
455/411
2015/0134954 A1 5/2015 Walley

OTHER PUBLICATIONS

PCT/EP2017/062234, Written Opinion of the International Searching Authority, dated Jun. 30, 2017, European Patent Office, D-80298 Munich.
EP16305646, European Search Report, dated Sep. 21, 2016, European Patent Office, Munich.

\* cited by examiner

METHOD FOR MANAGING THE STATUS OF A CONNECTED DEVICE

TECHNICAL FIELD

The present invention relates to a method and an apparatus for managing the ownership of a mobile device, and more particularly to the technical domain of distributed databases.

BACKGROUND OF THE INVENTION

Most mobile devices nowadays are insured in order to be protected against accidental events such as loss, theft or destruction.

Insurance frauds have become common, whereas victims are not only the stolen person but could also be the second hand buyer of a stolen device. As an example, a stolen device can be sold in a country, where the device is not registered in any stolen device database or is not yet seen as stolen.

According to the 3rd Generation Partnership Project (3GPP) standard, an identifier of the device that is declared as stolen is stored in a database of the operator. A thief is in that case able to sell the stolen device to a second hand purchaser while the legitimate owner is in the process of declaring the device stolen to the police, its operator and its insurance. If the victim tests the device at the time of purchasing it, it is perfectly functional as it is not yet seen as stolen by the telecommunication system. However, when the device connects to the network later on, it can be blocked by an operator that share the database with the original operator. The main victims are in practice the insurance companies and the second hand device buyers, the original buyer being generally refunded by its own insurance company.

In 3GPP, the identifier of the device is the International Mobile station Equipment Identity (IMEI) and the database is referred as the Equipment Identity Register (EIR). When a device is declared stolen, its IMEI is provisioned into the EIR database of an operator. When the device connects to the 3GPP network, its IMEI is sent to the EIR database and controlled against the ones that are stored in the EIR database. As already underlined, if the device has been declared as stolen, it will not be able to connect to the network. This technology has several limitations. First, the EIR database may not be shared between enough operators for the technology to be efficient. Second, the process is lengthy before a device use can really be forbidden. Then, the access to the EIR database information is limited to one or several mobile operators. It has also to be noted that this technology is limited to the declaration of stolen devices in order to forbid their use.

Another existing technology employed in the context of the Internet of Things (IoT) and related to the management of the ownership of a mobile device is now discussed.

Secondary devices such as smart watch or various sort of connected sensors such as Home environment management devices, weather sensors or Key Tags have typically limited or no user interface and may only have a wireless connectivity with the Internet, for example WiFi or cellular connectivity provided by an IoT Service Provider.

For instance in the case of a connected device such as a key tag used to locate one's key set, a link needs to be established between the device and the user. Then, the key tag can be located only by its registered owner. When the owner declares that his keys are lost, the community is mobilized to relay the location of the lost keys associated to the key tag back to its owner. The key tag ownership once associated to a given owner may be transferred to another one. It is required that the new owner is the only one who is able to declare his keys as lost and who is able to locate them. Indeed, a privacy issue would be encountered if the former owner could declare the device as lost because he would be able to locate its new owner. A process to transfer the ownership of a device from a former owner to a new owner does exist but is cumbersome and lengthy. An example of such a device is the companion device called Tile (trademark) and provided by Tile Incorporated.

A secret code could also be used as the proof of ownership. Providing the secret code to the new owner could be used as a solution to the problem. However, this technique implies several drawback. The original user may have lost or forgotten the secret code. Further, the secret code could be 'sold' to multiple victims independently of the physical device. This is the case for example when IoT devices are installed in various places.

Therefore, there is a need of a technology ensuring that the ownership of a device is legitimate and allowing to transfer this ownership securely and efficiently from a first owner to a second owner.

SUMMARY OF THE INVENTION

The invention relates to a method for managing the status of a connected device by publishing assertions in an immutable distributed database composed of a plurality of compute nodes, a pair of keys comprising a public key and a private key being associated with the connected device. The method comprises the steps of:

receiving by the connected device from a first terminal associated to a first user an instruction message comprising an identifier of said first user and at least a status information to be taken into account for the connected device, said status information being used to manage the ownership of the connected device;

verifying by the connected device that the first user is allowed to modify the status of the connected device and in case of a positive verification, preparing an assertion request comprising the status information, the assertion request being signed by the connected device using its private key;

sending by the connected device the assertion request to the immutable distributed database for publishing an assertion comprising the status information, the assertion being published once the signature is positively verified by a compute node of the immutable distributed database using the public key associated to the connected device.

As an example, the status information comprises an identifier of the new owner of the connected device.

As an example, the identifier of the new owner is the public key belonging to a pair of keys comprising a public key and a private key, said key pair being attributed to the new owner of the connected device.

As an example, the instruction message comprises an identifier of the former owner of the connected device and an indication for replacing it by the new owner thanks to the publication of an assertion in the immutable distributed database indicating the new owner as the legitimate owner.

As an example, the received instruction message comprises a secret data, the first user being considered as allowed to modify the status of the connected device if the received secret data is identical to a secret data stored in the connected device which demonstrates that the first user and the connected device are sharing the same secret.

As an example, the ownership of the connected device is transferred from the first user to a second user for him to become the new owner, the transfer being initiated by the second user using a second terminal to which it is associated by sending an acknowledgement message to the first terminal, said acknowledgment message comprising at least an instruction for transferring the ownership of the connected device to the second user and an identifier of the second user.

As an example, the ownership of the connected device is transferred from a second user to the first user for him to become the new owner, the transfer being initiated by the second user using a second terminal to which it is associated by sending an acknowledgement message to the first terminal, said acknowledgment message comprising at least an instruction for transferring the ownership of the connected device to the first user and an identifier of the second user.

As an example, the connected device verifies that the first user is allowed to modify the status of the connected device by checking its internal ownership record or in the immutable distributed database if a publish assertion indicates that it is the legitimate owner of the connected device.

As an example, the instruction message is received from the first terminal on which an application is installed, said application being adapted to control the preparation of the instruction message.

As an example, the connected device sends a request to the immutable distributed database in order to read its status information as published in the immutable distributed database and receives in response said status information.

As an example, if the received status information indicates that the connected device is stolen or lost, it switches into a minimum service mode and waits for receiving instructions from its legitimate owner.

The invention also relates to a connected device which is associated to a status information accessible to a third party by reading an assertion published in an immutable distributed database composed of a plurality of compute nodes, a pair of keys comprising a public key and a private key being associated to the connected device, the connected device being configured to receive an instruction message comprising an identifier of a first user and at least a status information to be taken into account for the connected device;

to verify that the first user is allowed to modify the status of the connected device and in case of a positive verification, to prepare an assertion request comprising the status information, the assertion request being signed by the connected device using its private key;

to send the assertion request to the immutable distributed database for publishing an assertion comprising the status information, the assertion being published once the signature is positively verified by a compute node of the immutable distributed database using the public key associated to the connected device.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

In this specification, an innovation is proposed to manage the status of a connected device. In the following examples, it is described in the context of managing the ownership of a connected device. However, the invention is applicable more generally, to manage the status of a connected device. The status may correspond for example to ownership information or priority of access to a resource compared to other devices. Furthermore, the invention is described for a so-called IoT device as it is a particularly relevant use case. However, the invention can be used to manage the status of any type of connected devices, for example 5G smartphones, tablet computers or vehicles able to communicate via a wireless connection.

Figure 1:
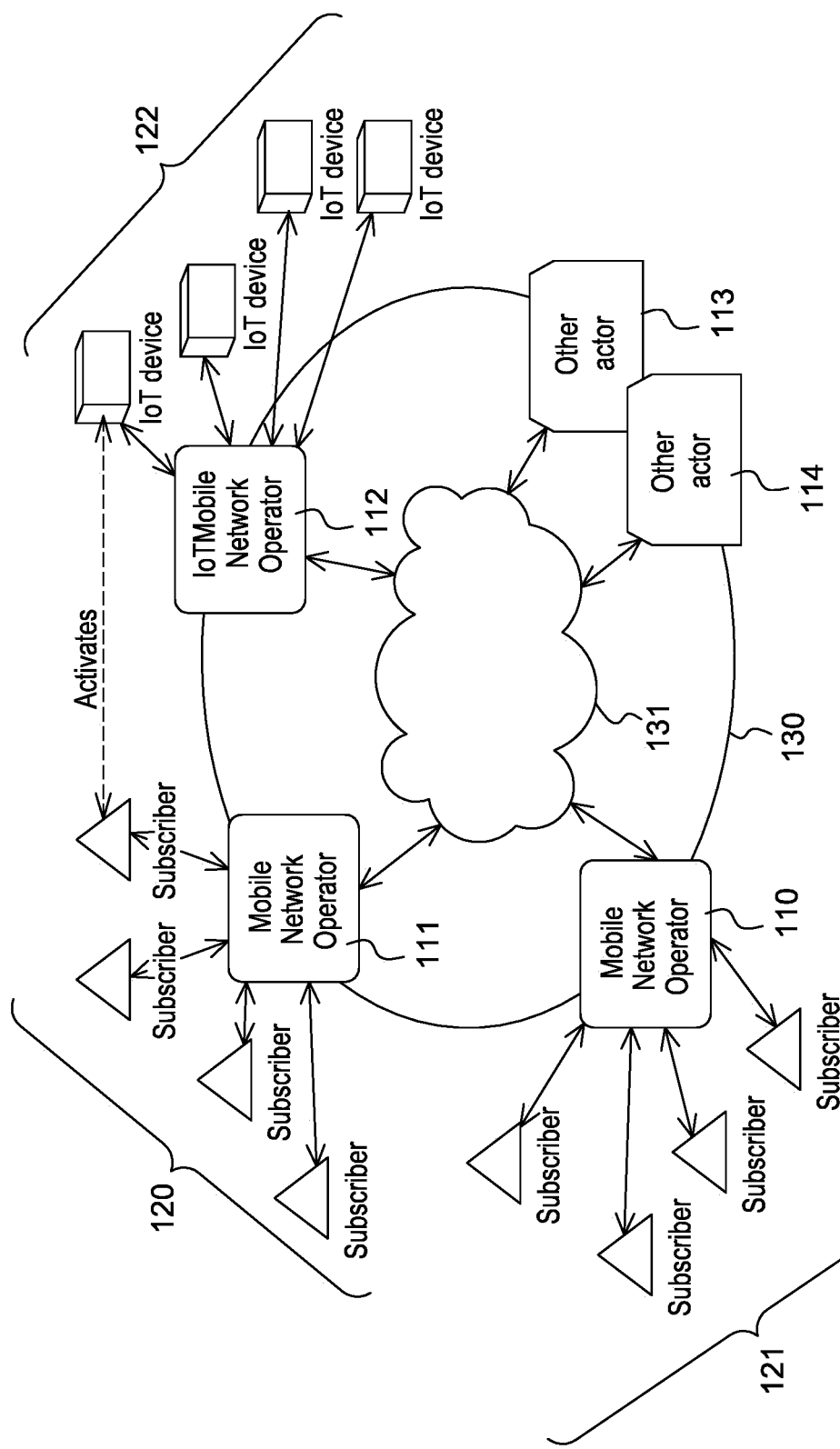
FIG. 1 is a schematic representation of a wireless system comprising a distributed data base used for publishing assertions that are validated and verified by a plurality of stakeholders.

FIG. 1 is a schematic representation of a wireless system comprising a distributed data base used for publishing assertions that are validated and verified by a plurality of stakeholders.

The system comprises a plurality of stakeholders 110-114. A stakeholder is a compute node that is operated by an actor of the wireless system. In this description a compute node refers to a device comprising hardware and software means to receive and transmit data on a communication network and executing programs. A computer connected to a network is an example of compute node.

In this example, two compute nodes 110, 111 are operated respectively by a first and a second mobile network operator, one compute node 112 is operated by an IoT mobile network operator, and two compute nodes 113, 114 are operated by other type of actors such as device manufacturers, the police, insurance companies or second hand market makers.

The system also comprises other entities designated as declaration entities. A declaration entity is an entity that is able to request the publication of one or several assertions in a distributed database 130. In this description, a distributed database refers to a database in which data is stored across a plurality of compute nodes of a network. According to a preferred embodiment, the distributed data base is immutable. An example of immutable distributed database that can be advantageously used in the context of this invention is blockchain.

In the example provided with FIG. 1 are represented four mobile devices 121 used by four subscribers of the first mobile network operator four mobile devices 120 used by four subscribers of the second mobile network operator, and four IoT devices 122 used by four subscribers of the IoT mobile network operator.

In this description, an IoT device refers to a mobile device comprising a Machine to Machine communication module. Machine to Machine (M2M) refers to transmission of data from one terminal to another terminal or exchange of data between machines through GSM/GPRS, UMTS/HSDPA, CDMA/EVDO, LTE or other modules. At present, M2M is generally applied in the fields of security surveillance, automatic vending machines, public traffic systems, vehicle monitoring and management, industry process automation, motor machineries, smart city, etc.

In this example, these devices are not stakeholders and have only the role of declaring entity. However, a given actor of the system may also need to publish assertions in the distributed database. In that case, a given compute node may be configured to implement the functions of a stakeholder and of a declaring entity. This is the case for example for the two IoT device manufacturers 113, 114 which can both operate a compute node that will be configured as such.

In the context of this particular example, the main functions of the different actors of the system are described thereafter.

A mobile network operator owns its subscribers, or have access to the home operator (HPLMN) of a subscriber. It can be responsible for the enrolment of its subscribers on the distributed database. The MNO provide mobile devices with an access to its network resources such as its radio network, its subscription services and authentication function. The MNO is also responsible of verifying credentials and authenticating a mobile device. It can also verify the services subscribed by a user. Further, its network is configured to provide an access to the distributed database. As already underlined, it can also be an actor which is able to verify and publish signed assertion in the distributed database.

For cryptographic operation, or secure information storage, the IoT device can be associated to a secure element, for example a UICC, an eSE or an eUICC.

The secure element is for example a UICC (Universal Integrated Circuit Card). It can be in the format of a smart card, of a packaged chip, or any other format. It can be used in mobile terminals in GSM and UMTS networks for instance. The UICC ensures network authentication, integrity and security of all kinds of personal data.

The UICC mainly contains a SIM application for GSM/GPRS networks and in a USIM application for UMTS network it is the USIM application. For networks supporting Long-Term Evolution (LTE), the UICC contains an ISIM application. A UICC may also contain several other applications, making it possible for the same smart card to give access to UMTS and LTE networks, and also allows storage of a phone book as well as other types of services.

A UICC can normally be removed from a mobile terminal or an IoT device. After having inserted his UICC in his new terminal, the user will still have access to his applications, contacts and credentials (network operator).

The secure element can also be of eUICC type (embedded UICC). eUICCs are UICCs that are either soldered either not totally linked to devices but that are removable with difficulty because they are not intended to be removed, located in terminals that are distant or deeply integrated in machines. A special form factor of the UICC (very small for example and therefore not easy to handle) can also be a reason to consider it is in fact integrated in a terminal. Technologies that are implementing the functionalities of secure element by software can also be considered in the context of this invention.

A subscriber of a mobile network operator has a valid subscription with a Mobile Network Operator (MNO). The subscriber can also have its own Public/private key pair that can be used in the system, for example via its mobile network operator. The subscriber is the one that will be capable of activating the IoT device he has purchased.

To perform the cryptographic process leading to the activation of a given IoT device, the subscriber can be associated to a mobile device, for example a smartphone, or an application in a Secure Element.

The distributed database can integrate all valid assertions signed and verified by the stakeholders of the system. Those are accessible to the stakeholders of the system, each of whom is able to read a given assertion published in the system and to authenticate the declaration entity which required its publication.

As a summary, the telecommunication system as described in FIG. 1 comprises:

A distributed database 130 made of a plurality of stakeholders 110-114 operated by network operators 110-112 or other actors 113, 114 such as device manufacturers, device certification entities, insurance companies, the police or second hand market makers;

One or several devices 120, 121 which are allowing subscribers to access to the distributed database for requesting the publication of assertions using for example a downloaded application;

One or several devices 122, for example IoT devices, which ownership needs to be managed and which are able to interact with the distributed database 130;

A telecommunication network 131 that is used to connect the different actors.

The roles and responsibilities that can embrace the different actors of the system are described hereafter. All these roles and responsibilities are not mandatory to implement the proposed mechanism for managing devices ownership and are given hereafter for illustration purposes only.

The distributed database 130 can be responsible for:

making a published assertion repository accessible and available to all actors of the system;

guarantying the anonymity of the originators of the published assertions;

verifying the authenticity and validity of the published assertions published;

time stamping and signing the assertions to be published;

back-upping of users private/public key pairs, and providing key recovery process.

The IoT devices 122 can be responsible for:

maintaining a list of legitimate owners. There can be one or several owners for each device and those can be can be identified by the public keys of a public/private key pair that is attributed to each device;

accepting a user, which can be identified by its public key, as his first primary owner once it is verified that he knows a secret code which is associated to the device;

verifying the authenticity and validity of instructions received from its legitimate owners;

computing securely public key based cryptographic algorithms;

generating and transmitting signed assertion requests to stakeholders of the distributed data base;

verifying when required the status of the device which is published in the distributed database;

alerting its legitimate owner that it is going online again after being declared as lost or stolen.

The user, using a connected terminal, can be responsible for:

obtaining an application on a connected terminal for monitoring or changing the status of the IoT device.

The connected terminal can be for example a mobile terminal, a tablet computer, a laptop or a smart watch;

acquiring secret codes associated to IoT devices;

requesting ownership declaration/assertions from an IoT device via the downloaded application;

triggering the sending of an assertion request by the IoT device.

The downloaded application can be responsible for:

obtaining or generating a public/private key pair associated to the user;

storing securely the private key of the user, for example inside a secure element;

executing cryptographic algorithm securely, for example inside a secure element, on behalf of the user;

generating and sending instructions to the IoT device, related for example to the initial ownership information or to a transfer of ownership;

generating and sending the user's assertion requests to at least a stakeholder of the distributed database, in order for example to declare that a device is lost or stolen;

backup of the user's public/private key pair.

The responsibilities of the other actors depends of their quality. As an example, a certification entity may declare a device adequately secure to perform certain operations. The actor is then responsible for such declaration. The police may declare in the distributed database that some devices are invalid.

Any actors can verify the status of ownership of any device identified by its public key.

Figure 2:
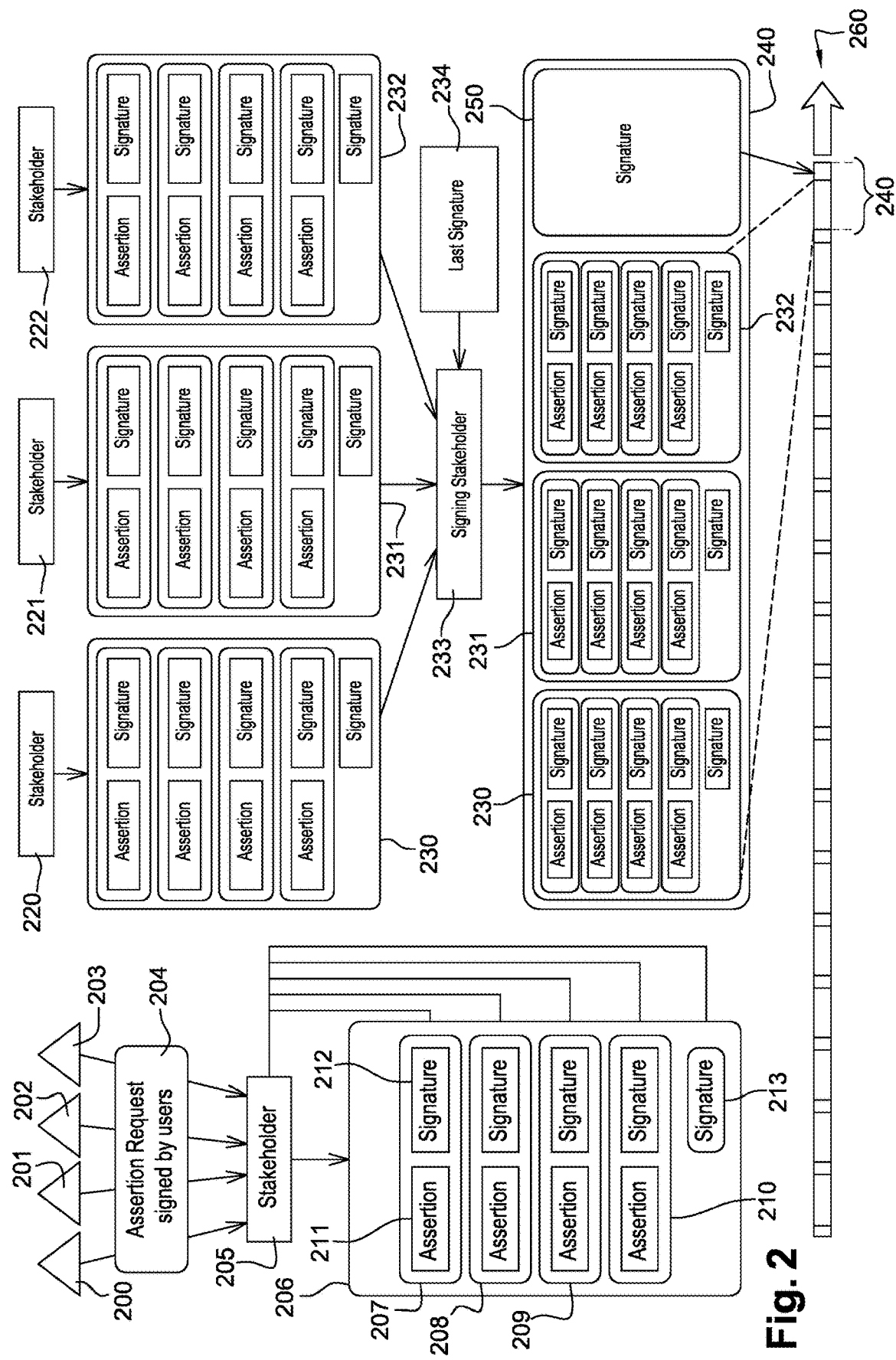
FIG. 2 illustrates an example of processing that can be carried out for publishing an assertion in the distributed database.

FIG. 2 illustrates an example of processing that can be carried out for publishing an assertion in a distributed database.

At a given processing period, a first stakeholder 205 collects four assertion requests 204 from four declaration entities 200-203. An assertion request is a message comprising at least a part of the information to be published by the stakeholders in the distributed database.

According to one embodiment of the invention, a key pair comprising a public and a private key is associated to each declaration entity. This type of key pair is designated as a declaration entity key pair or DE key pair. Further, the DE public key or the result of a one-way function or hash function (e.g. SHA-256) applied to the DE public key can be used as an identifier of the declaration entity. The declaration entity can use the private key of the DE key pair to sign the assertion request.

As an example, an assertion request comprises an identifier of a declaration entity, for example to the DE public key. It can also comprise a label indicating the subject of the assertion. This label is a digital sequence that can later be interpreted by a stakeholder.

Then, the first stakeholder can authenticate the declaration entities that have signed the assertion requests using their DE public key and generate an assertion block 206.

An assertion block 206 comprises all the assertions that have been received by the first stakeholder 205 during a given processing period. It can be constructed by signing each received assertion using the private key of the FS key pair and or alternatively by signing the whole block, also using the private key of the FS key pair.

Then, the first stakeholder 206 sends the signed assertion block to a second stakeholder 233.

During a given processing period, the second stakeholder 233 can receive none, one or several assertion blocks 230-232 emitted by one or several stakeholders 220-222. Then the second stakeholder will aggregate the received assertion blocks and sign the result of this aggregation in order to provide an aggregated assertion block 240.

The aggregated assertion block 240 can then be published 260 in the distributed database.

According to one embodiment, the signature 250 is generated thanks to a key pair that has been attributed to the second stakeholder. This key pair is designated as the second stakeholder (SeS) key pair and comprises an SeS private key and an SeS public key. In a preferred embodiment, the signing algorithm that is used takes as inputs the assertion blocks 230, 231, 232 received during the current processing period as well as the signature 234 that has been generated for the last aggregated assertion block published in the distributed database.

The advantage of the process is to allow detection by any stakeholders of unauthorized insertion or deletion of previously signed aggregated assertion block in the distributed database. The addition of an aggregated assertion block into the database can only be performed at the end of the database.

A database allowing to detect by any stakeholders unauthorized insertions or deletions is often designated as immutable, which is the case in the example provided with FIG. 2. In this description, the mentioned distributed databases are immutables.

According to an embodiment of the invention, before publishing the signed aggregated assertion block, a verification is handled by all or part of the stakeholders of the distributed database.

Once the signed aggregated assertion block is published, any stakeholder can access to the published assertion, verify the signature of the aggregated assertion block and verify that a given assertion has been emitted by an identified declaration entity.

The skilled person will understand that a given stakeholder can implement the functions of both aforementioned 'first' and 'second' stakeholders. However, it is highly preferable that the stakeholder generating a given assertion block and the one generating the signed aggregated assertion block comprising said given assertion are different.

It is important to note that unlike peer-to-peer databases such as Bitcoin, only the stakeholders of the system can have access to the published assertions. For that purpose, a stakeholder needs to be registered to a trusted third party. This trusted party can be implemented by a compute node which itself is a stakeholder. As an example, the trusted third party TTP1 is the first registered stakeholder of the system. When a new actor wants to join the scheme, it has first to register to one of the stakeholders, for example to TTP1. Then, as an example, TTP1 verifies the credentials and capabilities of the new actor. If the verification is successful, TTP1 can provide an assertion to the stakeholder generating the signed aggregated assertion block showing that the new actor is registered by TTP1. Once the new actor registration assertion is published to the distributed database, the new actor is registered and become a new stakeholder of the scheme. This new stakeholder can then register new actors and generate assertions blocks and aggregated assertion blocks to be published to the distributed.

A key pair comprising a public and a private key is allocated to each registered stakeholder. This corresponds to the FS and SeS key pairs that are respectively allocated to the first and the second stakeholders mentioned for explanatory purpose with FIG. 2.

A given stakeholder knows the public keys of all registered stakeholder. Therefore, they are capable of verifying at any time that a given aggregated assertion block or a given assertion block has been correctly signed by an authorized (i.e. registered) stakeholder.

Figure 3:
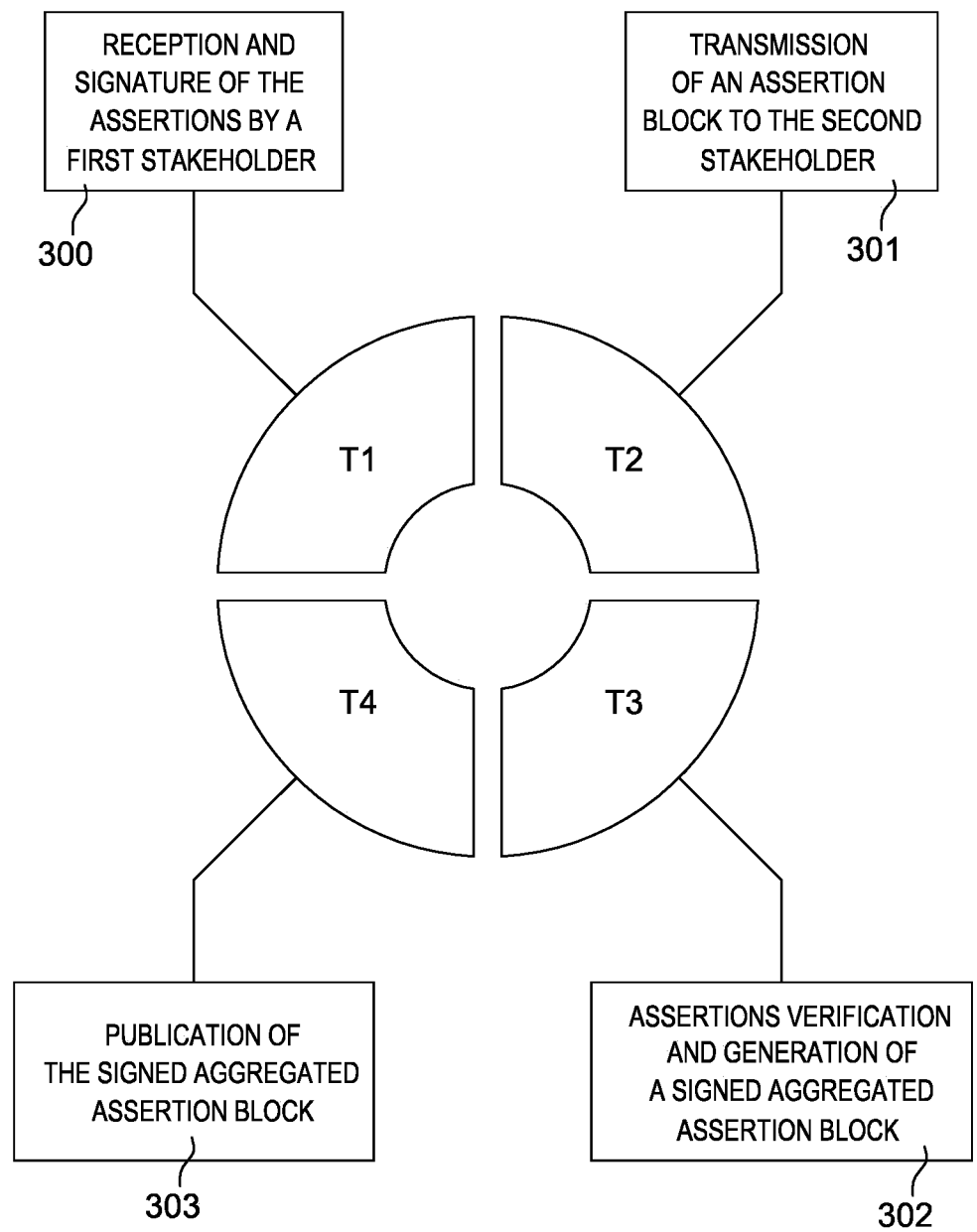
FIG. 3 shows schematically how the processes leading to the publications of one or several assertions can be organized in time.

FIG. 3 shows schematically how the processes leading to the publications of one or several assertions can be organized in time.

In this example, a processing cycle is composed of four processing periods T1, T2, T3 and T4 of specified durations that may depends on the system attributes such as the number of stakeholders or the number of assertions to be processed, load of the system.

During the first processing period, the assertions are received by a first stakeholder. An assertion block composed of one or several assertions is generated and signed 300.

During the second processing period, the signed assertion block is transmitted 301 by the first stakeholder to a second stakeholder. The second stakeholder can be chosen based on a predetermined schedule, a given stakeholder being designated for each processing period as the one that will generate the aggregated assertion blocks. Alternatively, the second stakeholder can be chosen randomly.

During the third processing period, the second stakeholder generate and sign 302 an aggregated assertion block.

During the fourth processing period, all the stakeholders of the system verify the validity of the signed aggregated assertion block and in case of a positive verification, the block is published 302 in the distributed database.

The sequence of processing period is provided for exemplary purpose. The skilled person will understand that the sequence of processing period can be handled differently. For example, processes 300 and 301 can be handled in a first processing period and processes 302 and 303 can be handled in a second processing period.

Figure 4:
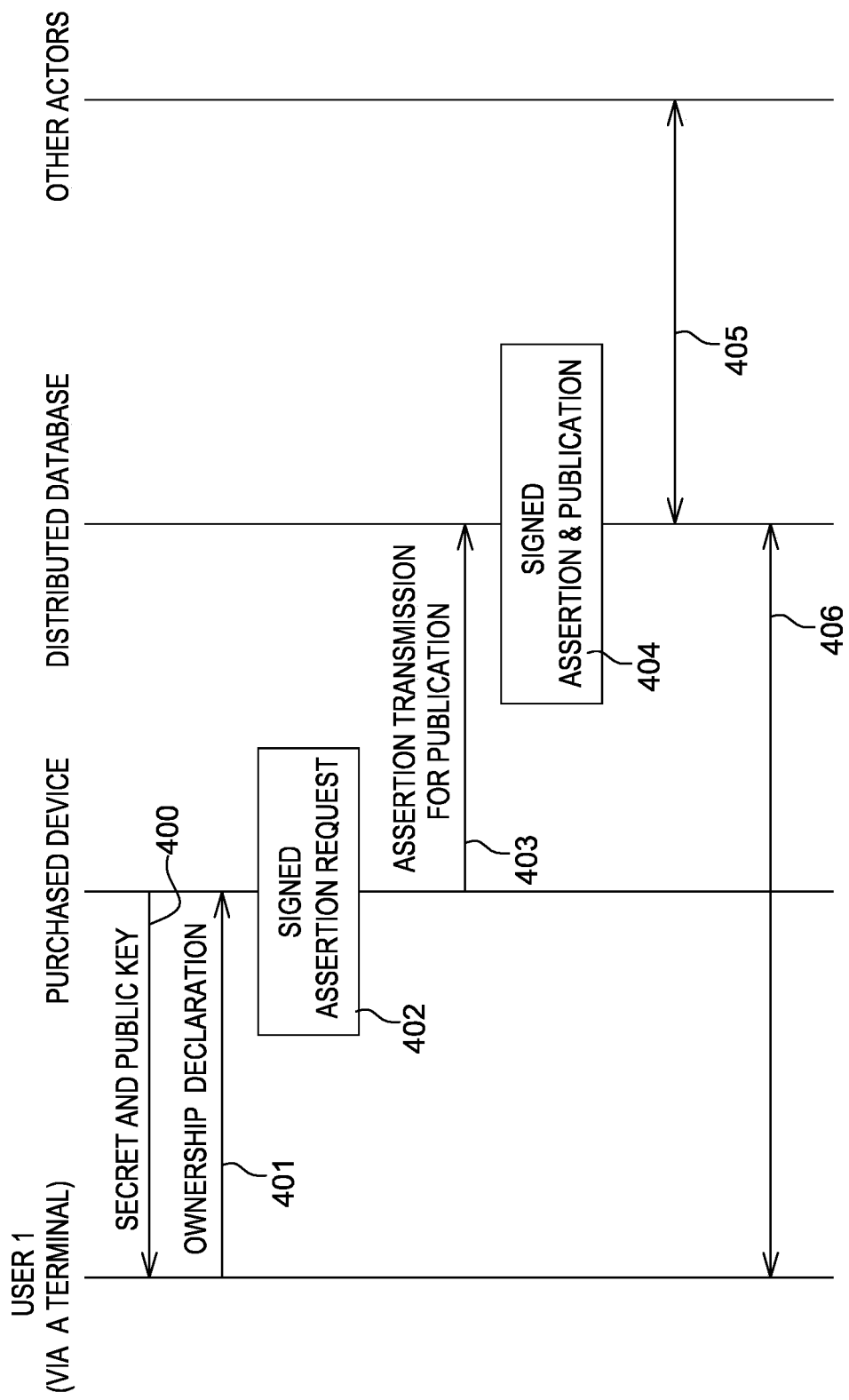
FIG. 4 is an example of sequence diagram which can be carried out for an initial declaration of ownership of a device that is purchased by a first user.

FIG. 4 is an example of sequence diagram which can be carried out for an initial declaration of ownership of a device that is purchased by a first user.

In this example, the first user USER1 uses a terminal, for example a mobile terminal, a laptop or a tablet computer, on which an application allowing to access to a service for managing the ownership of an IoT devices. The application can made available on an application market, such as Apple Store or Google Play (Apple and Google are registered trademarks).

It is assumed that USER1 is enrolled to use the service. According to an embodiment, once enrolled, the terminal on which the application is installed is provisioned with a private/public key pair. This key pair can also be generated locally by the terminal. It is also possible that USER1 terminal comprises of cooperates with a secure element storing the key pair. This secure element can also be adapted to perform cryptographic algorithm within a secure environment. This secure element is for example a UICC, an eUICC or an eSE.

The newly purchased IoT device, which ownership needs to be managed, comprises a secret that will be shared with USER1. This secret is for example a code such as a personal identification number (PIN), a serial number or an IMEI. It can be printed on the device, on the device user manual or more generally on the place which can only be known by the legitimate owner of the IoT device, for instance after opening the device packaging.

In case the secret is printed on the device, it can take the form of a series of characters, digits or of a flash code (QR code). Alternatively, it can be stored in a contactless tag, or generated by the IoT device and displayed to USER1.

According to another embodiment, the IoT device has its own public/private key pair, stored inside the device in a secure permanent memory, a secure element, a UICC or an eUICC.

USER1 acquires 400 the IoT device secret and the device's public key. This can be done by reading these information on the IoT device or on its original packaging and then keyed in, or acquired using the terminal's camera or using a short-range wireless interface such as a Near Field Communication (NFC) interface.

USER1 terminal then generates an ownership declaration by performing a cryptographic signature of a declaration that includes for example:
- an instruction stating that USER1 is the owner of the IoT device;
- USER1 public key which is provided as an identifier on the declared owner;
- the IoT device's public key which is provided as an identifier of the device for which the ownership is claimed;
- the secret code, which can be ciphered with the IoT device's public key.

For example, the declaration can be signed using the private key attributed to USER1.

The declaration is then transmitted 401 to the IoT device via a communication interface, for example using direct device to device communication or alternatively through a wireless telecommunication network.

USER1 may also optionally send the same declaration to a stakeholder of the registered database (not represented).

According to one aspect of the invention, the authenticity of the ownership declaration received by the device can be checked before generating the assertion by checking the signature of the said declaration using USER1 public key.

The IoT device may also verify that the declaration comprises the correct public key identifying the IoT device and the correct secret for this device.

Upon reception of the declaration, the IoT device can decipher the secret code if it has been ciphered, verify the secret code and generate 402 a signed assertion request if the provided secret code matches a reference code stored inside the IoT device. As an example, the signed assertion request comprises:
- an indication that the assertion request relates to an ownership declaration;
- an identifier of the owner, for example USER1 public key;
- an identifier for the device, for example the public key of the IoT device;
- a signature, that is generated by the IoT device using its private key.

Then, the signed assertion request is sent 403 by the IoT device to a stakeholder of the distributed database.

Upon reception of the assertion request, the stakeholder verifies its validity. For that purpose, it is checked that:
- the signature is valid by using the public key of the IoT device;
- this is an initial declaration of ownership;

If the assertion is valid, the stakeholder can prepare an assertion for it to be published into the database. As for the example proposed with FIG. 2, the stakeholder receiving the assertion request will prepare the assertion. The assertion will comprise for example:
- an indication that the assertion relates to an ownership declaration;
- an identifier of the owner, for example USER1 public key;
- an identifier for the device, for example the public key of the IoT device;

a signature, that is generated by the stakeholder that received the assertion request using its private key.

Then, the stakeholder can construct an assertion block comprising a set of at least one assertion, and transmit it to a second stakeholder that may aggregate and sign several assertion block in order to generate a signed aggregated assertion block that will then be published in the distributed database.

Once published, the assertion identifying the owner of the IoT device is accessible 405, 406 by any allowed actors, including USER1 via its terminal and the IoT device itself.

Figure 5:
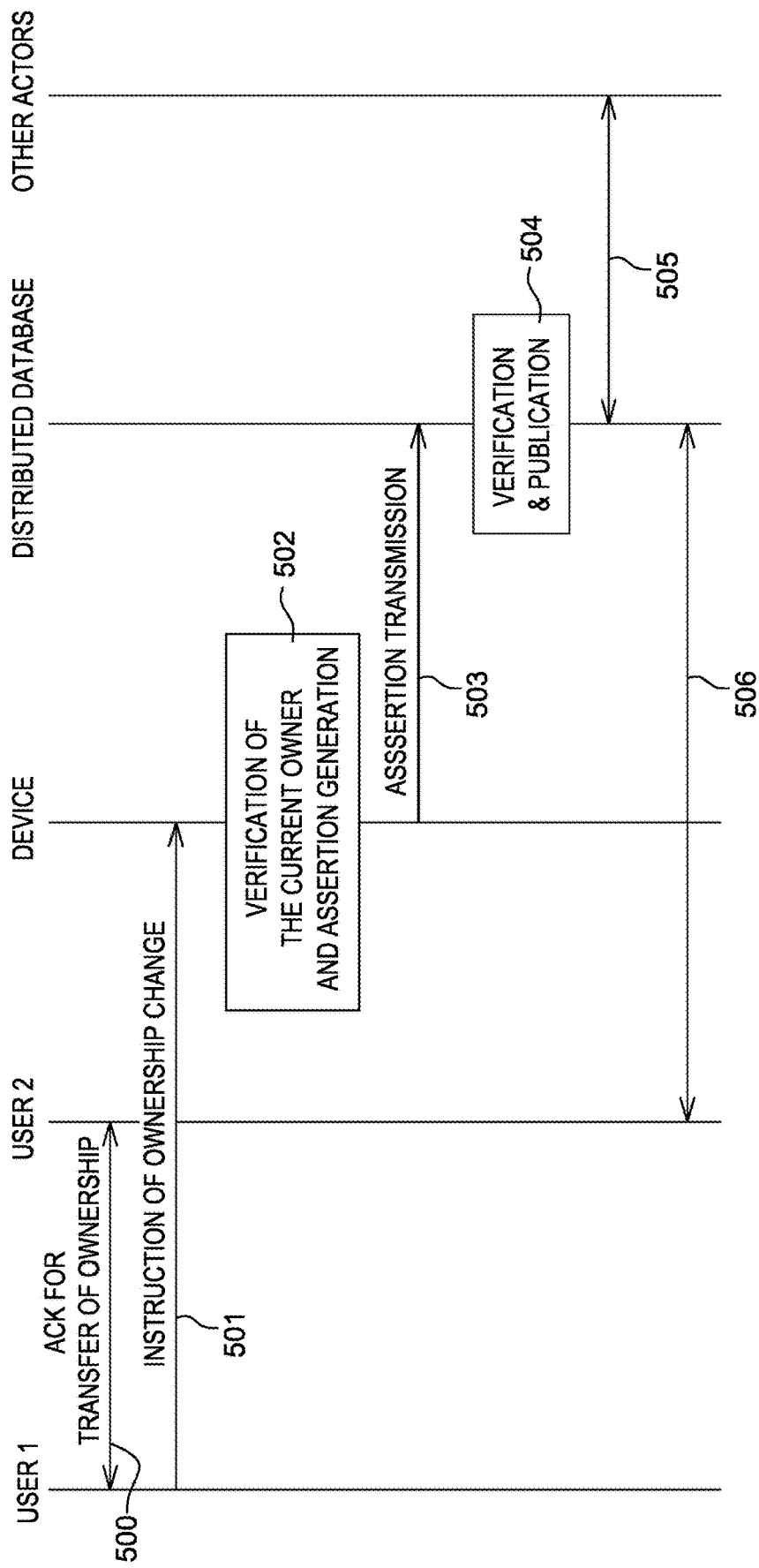
FIG. 5 is an example of sequence diagram which can be carried out for declaring a transfer of ownership.

FIG. 5 is an example of sequence diagram which can be carried out for declaring a transfer of ownership.

In this example, a second user designated as USER2 wants to acquire an IoT device owned by a first user designated as USER1.

USER1 and USER2 have obtained respectively their associated public/private key pairs using an application downloaded on their terminals.

Further, it is assumed that USER1 has performed successfully with the IoT device, an initial ownership declaration as illustrated with the example of FIG. 4. Therefore, the corresponding assertion is published in the distributed database.

The transfer of ownership can be initiated when USER2 provides to USER1, its acknowledgement 500 for the transfer of ownership, signed with USER2 private key. The acknowledgement includes for example:
  an acknowledgment of transfer of ownership of the IoT device;
  an identifier of the device, for example the public key of the IoT device;
  USER2 public key as an identifier of the new user;
  a signature, that is generated by USER2 using its private key.

For example, USER2 can verify prior to the acquisition, that USER1 is the actual owner of the IoT device by accessing the distributed database.

USER1 sends to the IoT device using its terminal a change of ownership instruction 501 signed using USER1 private key. The instruction includes for example:
  an instruction to change the ownership of the IoT device;
  USER1 public key as an identifier of the current owner;
  USER2 acknowledgement of transfer of ownership of the IoT device.

Advantageously, it is not necessary for USER1 to send the secret code of the IoT device as USER1 is already registered as its legitimate owner.

Alternatively, the transfer of ownership is initiated when USER1 provides USER2 with an agreement of transfer of ownership of the IoT device signed with USER1 private key, following an initial step when USER1 and USER2 exchange their public key. The agreement includes for example:
  an agreement to change the ownership of the IoT device;
  an identifier of the device, for example the public key of the IoT device;
  USER1 public key as an identifier of the current owner;
  USER2 public key as an identifier of the new owner;
  a signature, that is generated by USER1 using its private key.

USER2 sends to the IoT device using its terminal a change of ownership instruction signed using USER2 private key. The instruction includes for example:
  an instruction to change the ownership of the IoT device;
  USER1 agreement of transfer of ownership of the IoT device;
  USER2 public key as an identifier of the new owner;
  a signature, that is generated by USER2 using its private key.

Upon reception of the instruction for changing its ownership, the IoT device performs 502 the following tasks:
  verifying the authenticity of the instruction or agreement from USER1 by checking the validity of the signature using USER1 public key;
  verifying the authenticity of the instruction or acknowledgment from USER2 by checking the validity of the signature using USER2 public key;
  verifying that USER1 is declared as the legitimate owner of DEVICE, for example by verifying in the distributed database that USER1 public key is published as the identifier of the current owner of the IoT device;
  generating a new assertion in order to declare USER2 as the new owner in replacement of USER 1;
  signing the declaration with the IoT device private key.

The assertion of ownership change is then transmitted 503 to a stakeholder of the distributed database.

Upon reception of this new assertion, the stakeholder performs 504 the following tasks:
  verifying the authenticity of the assertion using the IoT device public key;
  checking that there is no concurrent assertions in the distributed database;
  time stamps and signs the new assertion of ownership change with its private key;
  sending the assertion into an assertion block to a second stakeholder for it to be published;
  publishing the signed assertion in the distributed database.

From that stage, any actor 505 which is allowed to access to the distributed database can check the new ownership of the IoT device. In particular, USER2 can verify 506 that the ownership of the IoT device has been correctly transferred to him.

Figure 6:
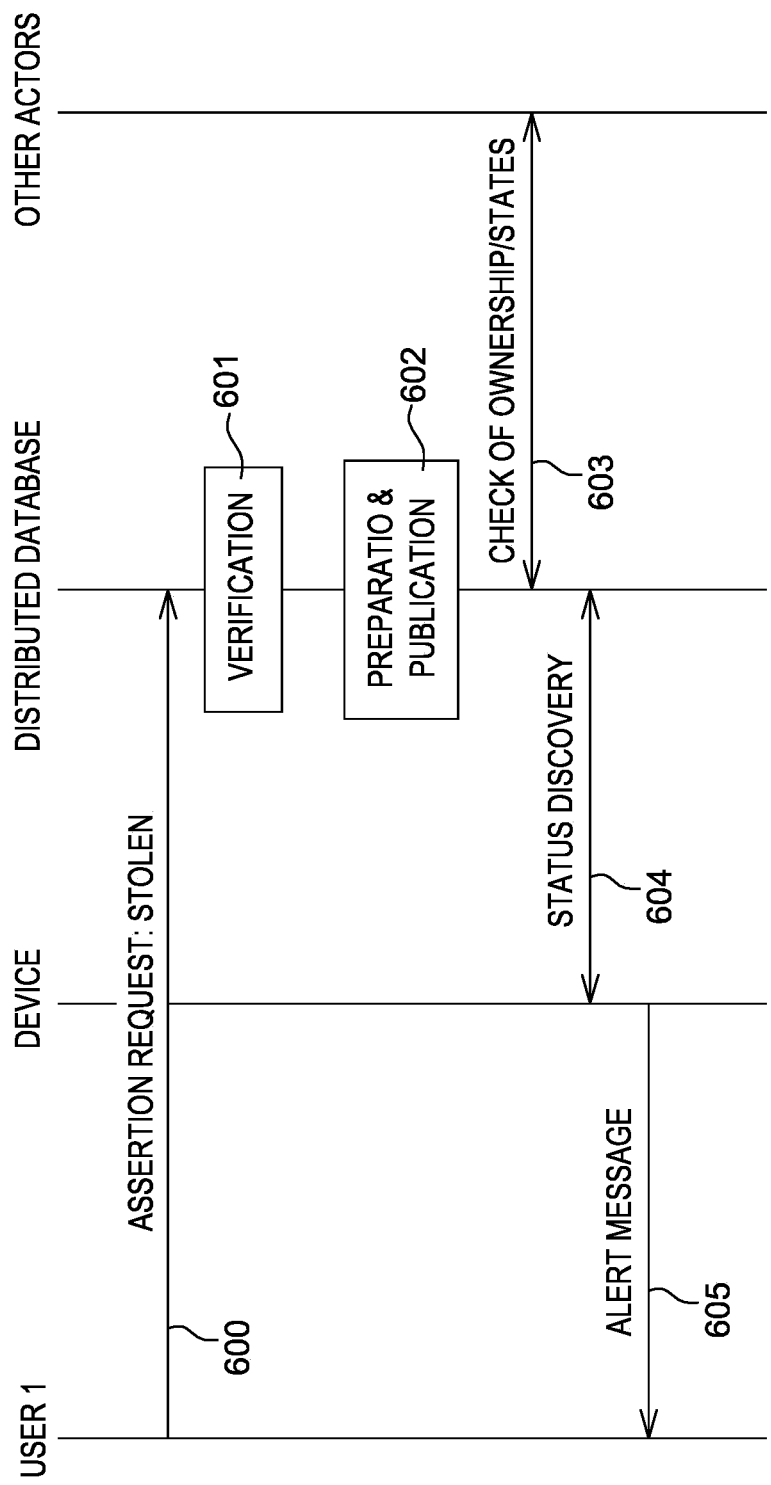
FIG. 6 is an example of sequence diagram which can be carried out for declaring that a device has been stolen.

FIG. 6 is an example of sequence diagram which can be carried out for declaring that a device has been stolen.

In the case of lost or stolen device, the legitimate owner is able to declare the theft or the loss immediately. This declaration will then be published in the distributed database such that any user of the system can check immediately after the publication what is the status of the device. According to this example, the legitimate owner of the device USER1 declares the device as being stolen. As an example, the result is that a status 'stolen' for this device will be published in the database. This new status information replaces for example a status 'regular' published in the distributed database showing that nothing bad happened to the IoT device.

Furthermore, other types of events can be declared resulting in a different status indicator published in the distributed database. For example, the loss of a device can be declared by the legitimate user and therefore, the status 'lost' will be published in the distributed database for this device.

The legitimate owner USER1, via a communication terminal having a downloaded application allowing a user to exchange data with the distributed database for managing the ownership of IoT devices, transmits 600 a declaration in an assertion request to the distributed database indicating that the device is lost. This assertion request is signed using USER1 private key and this process is handled by the aforementioned application.

For example, the assertion request comprises:
  an identifier of the owner, for example USER1 public key;
  an identifier for the device, for example the public key of the IoT device;
  an indication stating that the IoT device has been 'stolen'.

Upon reception of the assertion request and after verification of said request 601, an assertion is prepared and published 602 in the distributed database. More precisely and as an example, a first stakeholder of the distributed database verifies the authenticity of the declaration. For that purpose, the signature of the assertion request is verified using USER1 public key. Then, it verifies that the identifier of the owner as provided in the request matches the one which is published in the distributed database for this request. In the example, the identifier that is verified corresponds to the public key of the key pair of USER1.

If the declaration is authentic and valid, it is able to prepare an assertion indicating that the device belonging to USER1 has been stolen. The assertion may be composed of:
- an indication stating that the IoT device has been 'stolen';
- an identifier of the owner, for example USER1 public key;
- an identifier of the device, for example the public key of the IoT device;
- a signature, which is generated by the stakeholder that received the assertion request, using its private key.

The signed assertion is then published on the distributed database by a second stakeholder, for example in a signed aggregated assertion block as illustrated with FIG. 2.

Therefore, any actors having access to the distributed database can check 603 the current ownership and status of the device.

For instance, a future buyer of a device can see if it has been declared lost/stolen by its legitimate owner USER1.

Also, the police can detect that a given device has been declared lost/stolen by its owner, and any usage of the device can be considered illicit.

The police and insurance companies can be part of the system and can declare the device invalid for usage. As a consequence, anyone finding the device will be encouraged to report it to the police or return it to an insurance company.

In addition, the IoT device can check 604 its own status by accessing to the distributed database. This can be done periodically, when the device is switched on or switched off of upon the occurrence of a particular event.

In case the device discovers 604 that it has been declared lost, it can send an alert message 605 to USER1 indicating it is online again and that it is waiting for further instructions from USER1.

Furthermore, the IoT device may go into minimum service waiting for new instructions from its legitimate owner USER1.

USER1 may decide to reactivate the device by sending a reactivation instructions directly to the device, for example in case USER1 find it back. This would trigger the device to send an assertion request to the database for changing the status from stolen to regular.

The invention claimed is:

1. A method for managing the status of a connected device by publishing assertions in an immutable distributed database composed of a plurality of compute nodes, a pair of keys comprising a public key and a private key being associated with the connected device, the method comprising the steps of:
    receiving by the connected device from a first terminal associated to a first user an instruction message comprising an identifier of said first user and at least a status information to be taken into account for the connected device, said status information being used to manage the ownership of the connected device;
    verifying by the connected device that the first user is allowed to modify the status of the connected device and in case of a positive verification, preparing an assertion request comprising the status information, the assertion request being signed by the connected device using its private key;
    sending by the connected device the assertion request to the immutable distributed database for publishing an assertion comprising the status information, the assertion being published once the signature is positively verified by a compute node of the distributed immutable database using the public key associated to the connected device.

2. The method according to claim 1, wherein the status information status information comprises an identifier of the new owner of the connected device.

3. The method according to claim 2, wherein the identifier of the new owner is the public key belonging to a pair of keys comprising a public key and a private key, said key pair being attributed to the new owner of the connected device.

4. The method according to claim 3, wherein the instruction message comprises an identifier of the former owner of the connected device and an indication for replacing it by the new owner thanks to the publication of an assertion in the immutable distributed database indicating the new owner as the legitimate owner.

5. The method according to claim 1, wherein the received instruction message comprises a secret data, the first user being considered as allowed to modify the status of the connected device if the received secret data is identical to a secret data stored in the connected device which demonstrates that the first user and the connected device are sharing the same secret.

6. The method according to claim 2, wherein the ownership of the connected device is transferred from the first user to a second user for him to become the new owner, the transfer being initiated by the second user using a second terminal to which it is associated by sending an acknowledgement message to the first terminal, said acknowledgment message comprising at least an instruction for transferring the ownership of the connected device to the second user and an identifier of the second user.

7. The method according to claim 2, wherein the ownership of the connected device is transferred from a second user to the first user for him to become the new owner, the transfer being initiated by the second user using a second terminal to which it is associated by sending an acknowledgement message to the first terminal, said acknowledgment message comprising at least an instruction for transferring the ownership of the connected device to the first user and an identifier of the second user.

8. The method according to claim 1, wherein the connected device verifies that the first user is allowed to modify the status of the connected device by checking its internal ownership record or in the immutable distributed database if a publish assertion indicates that it is the legitimate owner of the connected device.

9. The method according to claim 1, wherein the instruction message is received from the first terminal on which an application is installed, said application being adapted to control the preparation of the instruction message.

10. The method according to claim 1, wherein the connected device sends a request to the immutable distributed database in order to read its status information as published in the immutable distributed database and receives in response said status information.

11. The method according to claim 10, wherein if the received status information indicates that the connected device is stolen or lost, it switches into a minimum service mode and waits for receiving instructions from its legitimate owner.

12. A connected device which is associated to a status information accessible to a third party by reading an assertion published in a immutable distributed database composed of a plurality of compute nodes, a pair of keys comprising a public key and a private key being associated to the connected device, the connected device being configured
- to receive an instruction message comprising an identifier of a first user and at least a status information to be taken into account for the connected device, said status information being used to manage the ownership of the connected device;
- to verify that the first user is allowed to modify the status of the connected device and in case of a positive verification, to prepare an assertion request comprising the status information, the assertion request being signed by the connected device using its private key;
- to send the assertion request to the immutable distributed database for publishing an assertion comprising the status information, the assertion being published once the signature is positively verified by a compute node of the immutable distributed database using the public key associated to the connected device.

13. The connected device of claim 12, wherein the status information comprises an identifier of the new owner of the connected device.

14. The connected device of claim 13, wherein the identifier of the new owner is the public key belonging to a pair of keys comprising a public key and a private key, said key pair being attributed to the new owner of the connected device.

15. The connected device of claim 14, wherein the instruction message comprises an identifier of the former owner of the connected device and an indication for replacing it by the new owner thanks to the publication of an assertion in the immutable distributed database indicating the new owner as the legitimate owner.

16. The connected device of claim 12, wherein the received instruction message comprises a secret data, the first user being considered as allowed to modify the status of the connected device if the received secret data is identical to a secret data stored in the connected device which demonstrates that the first user and the connected device are sharing the same secret.

17. The connected device of claim 13, wherein the ownership of the connected device is transferred from the first user to a second user for him to become the new owner, the transfer being initiated by the second user using a second terminal to which it is associated by sending an acknowledgement message to the first terminal, said acknowledgment message comprising at least an instruction for transferring the ownership of the connected device to the second user and an identifier of the second user.

18. The connected device of claim 13, wherein the ownership of the connected device is transferred from a second user to the first user for him to become the new owner, the transfer being initiated by the second user using a second terminal to which it is associated by sending an acknowledgement message to the first terminal, said acknowledgment message comprising at least an instruction for transferring the ownership of the connected device to the first user and an identifier of the second user.

19. The connected device of claim 13, wherein the connected device verifies that the first user is allowed to modify the status of the connected device by checking its internal ownership record or in the immutable distributed database if a publish assertion indicates that it is the legitimate owner of the connected device.

20. The connected device of claim 12, wherein the instruction message is received from the first terminal on which an application is installed, said application being adapted to control the preparation of the instruction message.

21. The connected device of claim 12, wherein the connected device sends a request to the immutable distributed database in order to read its status information as published in the immutable distributed database and receives in response said status information.

22. The connected device of claim 21, wherein if the received status information indicates that the connected device is stolen or lost, it switches into a minimum service mode and waits for receiving instructions from its legitimate owner.

23. The method according to claim 1, wherein the immutable distributed database is a database in which data is stored across the plurality of compute nodes of the immutable distributed database.

24. The connected device of claim 12, wherein the immutable distributed database is a database in which data is stored across the plurality of compute nodes of the immutable distributed database.

* * * * *